United States Patent [19]

Hansson

[11] 4,097,184
[45] Jun. 27, 1978

[54] PRESSURE OPERATED VALVE

[75] Inventor: Gunnar Christer Hansson, Stockholm, Sweden

[73] Assignee: Atlas Copco Aktiebolag, Nacka, Sweden

[21] Appl. No.: 702,984

[22] Filed: Jul. 6, 1976

[30] Foreign Application Priority Data

Jul. 11, 1975 Sweden .............................. 7507972

[51] Int. Cl.² .................... F01D 17/00; G05D 16/10; F16K 31/12
[52] U.S. Cl. ........................................ 415/49; 91/446; 137/466; 251/35; 251/43
[58] Field of Search ................................ 91/446, 448; 137/614.19, 464, 466; 173/12, 163; 251/35, 43; 415/49

[56] References Cited

U.S. PATENT DOCUMENTS

| 676,144 | 6/1901 | Martin | 137/466 |
| 880,030 | 2/1908 | Leavitt | 251/35 X |
| 2,055,576 | 9/1936 | Hollerith | 251/35 |
| 2,229,893 | 1/1941 | Hubka | 251/43 X |
| 3,529,622 | 9/1970 | Weise et al. | 251/282 X |

Primary Examiner—Gerald A. Michalsky
Attorney, Agent, or Firm—Flynn & Frishauf

[57] ABSTRACT

A pressure operated shut-off valve for controlling a pneumatic circuit for instance a supply passage of a pneumatic tool, in response to the motive air supply pressure. The valve comprises a valve body that is continuously biased in its closing direction by a spring means and in its opening diection by the motive air supply pressure. If the air pressure drops below a predetermined minimum value the valve is automatically shifted to a closed position by the load of the spring means. A valve body controlled passage means supplies pressure air to the rear end of the valve body as the latter occupies its closed position, thereby making the closed position stable.

16 Claims, 3 Drawing Figures

PRESSURE OPERATED VALVE

BACKGROUND OF THE INVENTION

This invention relates to a valve for automatic shut-off of a pneumatic circuit as the pressure therein drops below a predetermined value. Specifically, the invention relates to a valve, the valve body of which is maintained in an opened position by the air pressure against the action of a pre-load spring.

The valve according to the invention is intended to control such pneumatic circuits in which the pressure is not allowed to drop below a predetermined value. The purpose of the valve is to shut-off the circuit as the pressure drops below a normal level in order to avoid malfunction of machines or tools connected thereto.

One such circuit is the supply conduit of a pneumatic screw or nut runner. A special problem is concerned with screw or nut runners provided with torque limiting clutches. For obtaining an acceptable operation of such clutches it is a condition that the driving torque at the moment of release exceeds a certain value. If the driving torque is too low the clutch may not release at all. The result thereof is that instead of a short torque impulse a very strong reaction is transferred to the screw or nut runner housing. With hand held tools such torque reaction could cause serious damage to personnel as well as to the equipment. As the revolution speed during tightening of a screw joint is dependent on the motive air pressure it is very important that a predetermined minimum pressure is maintained. The purpose of the valve according to the invention is to shut-off the inlet passage and thereby interrupt power supply to the tool as the pressure becomes too low.

The object of the invention is to solve the above mentioned problem. This is accomplished by the valve defined in the claims.

DETAILED DESCRIPTION

Figure 1:
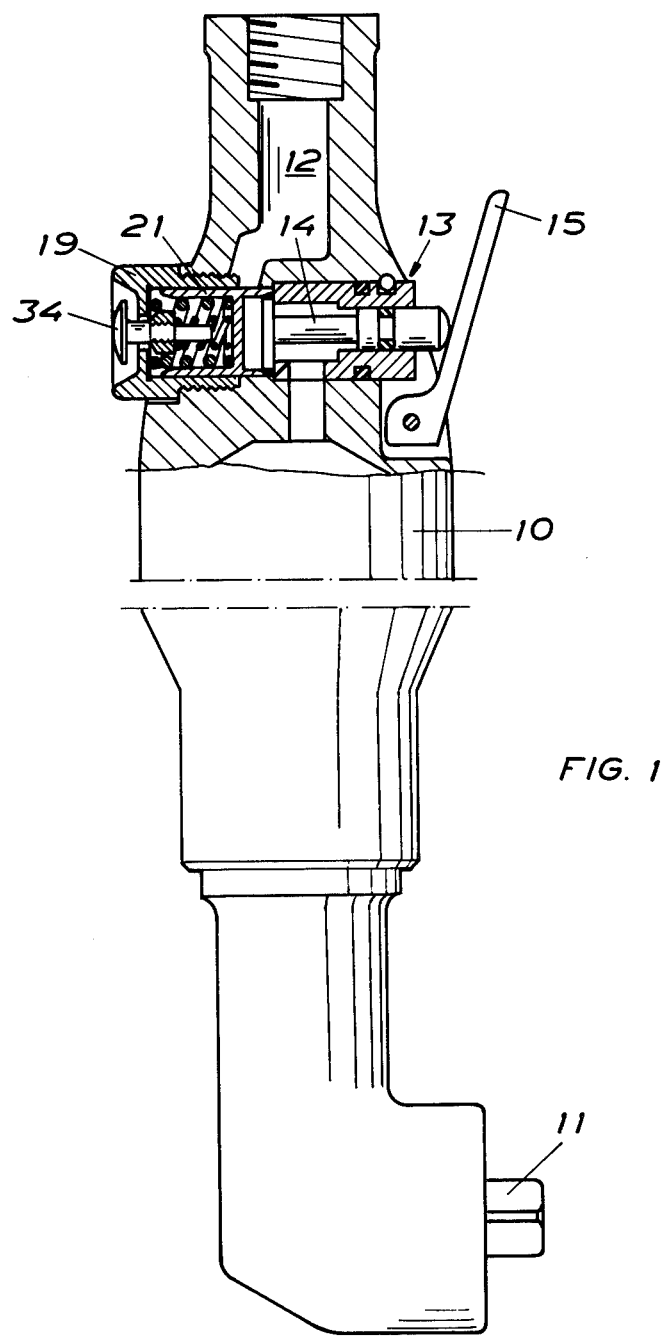
FIG. 1 shows a partly broken side elevation of a pneumatic angle nut runner provided with a shut-off valve according to the invention.

In the drawings 10 designates the housing of a nut runner. The housing encloses a motor (not shown) which is drivingly connected to an output shaft 11 formed with a drive square. At its rear end the housing 10 is provided with an inlet passage 12 for motive air. See FIG. 1.

Figure 2B:
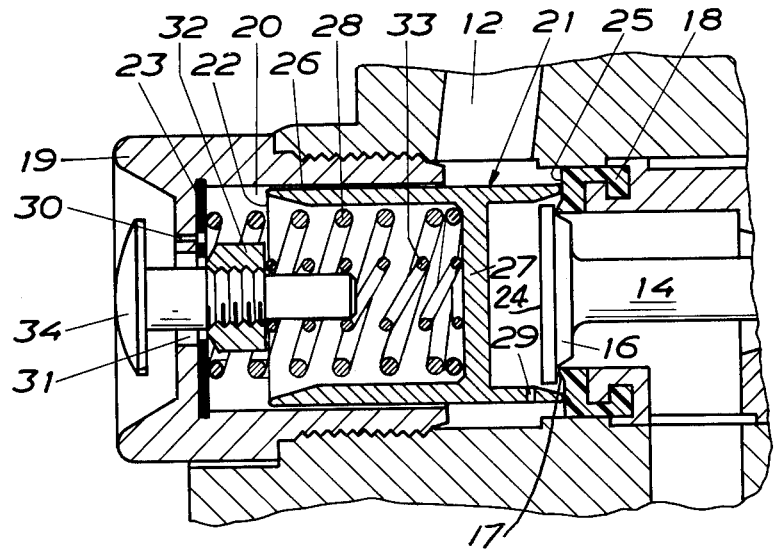
FIGS. 2a and 2b show, in larger scale, longitudinal sections through the shut-off valve in FIG. 1, FIG. 2a showing the valve in its open position and FIG. 2b showing the valve in its closed position.

A supply valve 13 for controlling the motive air flow is provided in the inlet passage 12, and comprises a valve body 14 which is shiftable by means of a lever 15. The valve body 14 has an enlarged head portion 16 (FIGS. 2a and 2b) which sealingly cooperates with an annular seat 17. The seat 17 is formed by an elastic sealing element 18.

Coaxially with the supply valve 13 the housing 10 is provided with a cup-formed valve housing 19 having a cylindrical bore 20. Within the bore 20 a tube-shaped valve body 21 is movably guided. At its opening direction facing end, hereinafter called its rear end, the valve body 21 is formed with an annular end portion 22 which is arranged to sealingly cooperate with a seat 23 at the end wall of the valve housing 19 as the valve body is in its open position. Similarly at its closing direction facing end, hereinafter called its forward end, the valve body 21 is provided with an annular end portion 24 which is arranged to sealingly cooperate with a seat 25 formed by the elastic sealing element 18.

The diameter of the bore 20 exceeds the diameter of the valve body 21 to form an annular clearance 26 around the valve body 21. The clearance 26 is intended to form a passage means for conducting pressure air to the rear end 22 of the valve body 21.

The valve body 21 is tube-shaped and provided with a transverse partition wall 27. Between this wall 27 and the end wall of the valve housing 19 there is supported a spring 28 for continuously loading the valve body 21 in its closing direction, toward the seat 25.

At its forward end 24 the valve body 21 is provided with a radial opening or passage 29 through which pressure air is continuously supplied to the forward end 24 of the valve body 21 even though the latter occupies its closed position.

The end wall of the valve housing 19 is provided with a leak opening 30 of small cross section which continuously connects the bore 20 to the atmosphere. The end wall is also provided with a pressure release opening 31 of large cross section. The opening 31 is normally kept closed by a valve 32 which is loaded toward the end wall of the housing 19 by a spring 33, and which is provided with a push button 34 for manual operation. At its opposite end the spring 33 is supported against the transverse wall 27 of the valve body 21. The cross section of the pressure release opening 31 is considerably larger than the cross section of the annular clearance 26 between the valve body 21 and the wall of the bore 20.

As the inlet passage 12 of the nut runner is connected to a pressure air source the shut-off valve continuously senses the pressure of the motive air and is intended to automatically interrupt the pressure air supply to the tool as the air pressure drops below a predetermined value.

Figure 2A:
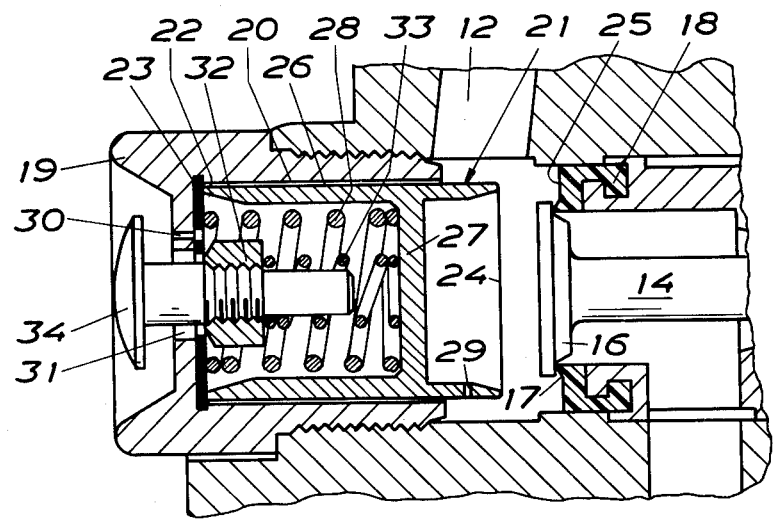

In its normal open position, as shown in FIG. 2a, the valve body 21 is influenced by air pressure acting upon the forward end 24 which results in an opening force that exceeds the total load of the springs 28 and 33. This opening force makes the valve body 21 occupy its fully open position in which its rear end 22 sealingly cooperates with the seat 23. In this position the rear end 22 of the valve body 21 is sealed off from the annular clearance 26 and the inlet passage 12. Thereby, pressure air cannot reach the rear end 22 of the valve body 21, and the leak opening 30 prevents pressure from being built up at the rear end 22 of the valve body 21 as a result of leakage past the seat 23. This position of the valve body 21 is stable and is maintained as long as the air pressure exceeds a desirable minimum level which is determined by the load of the springs 28,33. However, if the motive air pressure drops below this level the spring load acting upon the valve body 21 will become dominating and the valve body starts moving forwards in its closing direction. As a result of this movement the sealing engagement between the valve body 21 and the seat 23 is discontinued and pressure air is able to reach the rear end of the valve body 21 through the annular clearance 26, whereby the closing force acting upon the valve body 21 is further increased. The leak opening 30 has a considerably smaller cross section than the annular clearance 26 and will not influence the pressure that is built up at this end of the valve body.

So, at too low a pressure the valve body 21 occupies its closed position (FIG. 2b) wherein it blocks up the inlet passage 12 of the nut runner. In its closed position the valve body 21 sealingly cooperates with the seat 25. Through the radial opening 29 the forward end 24 of the valve body is continuously connected to the pressure air source.

The closed position of the valve is stable in that both of the ends of the valve body 21 are equally pressurized. A pressure increase cannot change this position. The closed position is maintained by the spring 28 and 33. The main object of the spring 33 is to support the pressure release value 32 but as the spring 33 is supported against the partition wall 27 of the valve body 21 its load has to be added to the load of the spring 28.

When the air pressure again exceeds the predetermined minimum valve the value may be reopened by manual operation of the push button 34 associated with the pressure release valve 32. Then the latter uncovers the opening 31, and the pressure at the rear end 22 of the valve body 21 is rapidly decreased to a level substantially corresponding to atmospheric pressure. As the pressure at the rear end 22 of the valve body 21 is released and the forward end 24 of the valve body is still subjected to full pressure via the radial opening 29 the valve body 21 is forced backwards against the action of the springs 28 and 33, towards its open position.

As the rear end 22 of the valve body sealingly engages the seat 23 the communication between the rear end of the valve body 21 and the annular clearance 26 is shut-off, and the pressure release valve 32 may be reclosed. Due to the fact that the leak opening 30 is continuously opened, air that may leak past the seat 23 is not able to build up a pressure at the rear end 22 of the valve body 21.

The invention is not limited to the shown and described embodiment. For instance reopening of the shut-off valve 21 can be accomplished otherwise than by a pressure release valve. However, the latter is advantageous in that an incorrect maneuvering thereof cannot have an influence on the valve body 21 as the latter is open.

Neither is the invention limited to the shown embodiment as regards the sealing element 18 which is common to the shut-off valve and the supply valve 13. The shut-off valve according to the invention is intended to operate completely independently of the supply valve 13.

What I claim is:

1. Pressure operated valve for automatic shut-off of a pneumatic circuit, comprising:
   a housing (19) connected to a pressure air source,
   a valve body (21) movable within said housing between an open and a closed position, and having an area (24) facing the closing direction and an area (22) facing the opening direction,
   a first passage means (29) continuously connecting the closing direction facing area (24) of the valve body (21) to the pressure air source when the valve body (21) is in both its open and closed positions,
   spring means (28, 33) continuously biasing the valve body (21) toward its closed position,
   a second passage means (26) which connects the opening direction facing area (22) of the valve body (21) to the pressure air source only when the valve body (21) occupies its closed position,
   means defining a pressure chamber in communication with said opening direction facing area (22) of the valve body (21) for receiving pressure air via said second passage means (26) and for building up pressure from said pressure air source when said valve body (21) occupies its closed position after being open so as to stabilize said valve body (21) in said closed position after being open, and
   said valve body including means (22) for closing said second passage means (26) when said valve body (21) occupies its open position.

2. Valve according to claim 1, wherein the valve body (21) is cylindrical and guided in a cylindrical bore (20) in the housing (19), the diameter of said bore (20) exceeding the diameter of the valve body (21) to thereby form an annular clearance between said bore (20) and said valve body (21), said annular clearance comprising said second passage means (26).

3. Valve according to claim 2, wherein the housing (19) is provided with a leak passage (30) continuously connecting the opening direction facing area (22) of the valve body (21) to the atmosphere, said leak passage (30) having a cross section that is considerably less than that of said second passage means (26).

4. Valve according to claim 3, comprising a manually operable pressure release valve means (31-34) arranged to selectively communicate the opening direction facing area (22) of the valve body (21) with the atmosphere, said pressure release valve means (31-34) having a cross section that is considerably larger than that of said second passage means (26), said pressure release valve means including a spring (33) to bias said pressure release valve means (31-34) toward a closed position to block said communication with the atmosphere.

5. Valve according to claim 2, wherein the housing (19) includes annular valve seats (23, 25), and wherein the valve body (21) comprises tube-shaped end portions (22, 24) which are arranged to alternatingly cooperate with the annular valve seats (23, 25) in the housing.

6. Valve according to claim 1 wherein the housing (19) is provided with a leak passage (30) continuously connecting the opening direction facing area (22) of the valve body (21) to the atmosphere, said leak passage (30) having a cross section that is considerably less than that of said second passage means (26).

7. Valve according to claim 6, comprising a manually operable pressure release valve means (31-34) arranged to selectively communicate the opening direction facing area (22) of the valve body (21) with the atmosphere, said pressure release valve means (31-34) having a cross section that is considerably larger than that of said second passage means (26), said pressure release valve means including a spring (33) to bias said pressure release valve means (31-34) toward a closed position to block said communication with the atmosphere.

8. Valve according to claim 6, wherein the housing (19) includes annular valve seats (23, 25), and wherein the valve body (21) comprises tube-shaped end portions (22, 24) which are arranged to alternatingly cooperate with the annular valve seats (23, 25) in the housing.

9. Valve according to claim 8, comprising a manually operable pressure release valve means (31-34) arranged to selectively communicate the opening direction facing area (22) of the valve body (21) with the atmosphere, said pressure release valve means (31-34) having a cross section that is considerably larger than that of said second passage means (26), said pressure release valve means including a spring (33) to bias said pressure release valve means (31-34) toward a closed position to block said communication with the atmosphere.

10. Valve according to claim 1, wherein the housing (19) includes annular valve seats (23, 25), and wherein the valve body (21) comprises tube-shaped end portions (22, 24) which are arranged to alternatingly cooperate with the annular valve seats (23, 25) in the housing.

11. Valve according to claim 1, wherein said closing direction facing area (24) comprises a closing direction facing end of the valve body, and said opening direction facing area (22) comprises an opening direction facing end of the valve body.

12. In a pneumatic screw or nut runner comprising a motor-driven output shaft, an inlet passage for motive air from a pressure air source, a motive air supply valve in communication with the inlet passage, and a pressure responsive shut-off valve disposed upstream of said supply valve and in communication with the inlet passage, the improvement wherein said pressure responsive shut-off valve comprises:
a valve body (21) movable between an open and a closed position and having an area (24) facing the closing direction of movement thereof and an area (22) facing the opening direction of movement thereof,
a first passage means (29) continuously connecting the closing direction facing area (24) of the valve body (21) to the inlet passage and thereby to the pressure air source when the valve body (21) is in both its open and closed positions,
spring means (28, 33) continuously biasing the valve body (21) toward its closed position,
a second passage means (26) which connects the opening direction facing area (22) of the valve body (21) to the inlet passage and thereby to the pressure air source only when the valve body (21) occupies its closed position,
means defining a pressure chamber in communication with said opening direction facing area (22) of the valve body (21) for receiving pressure air via said second passage means (26) and for building up pressure from said pressure air source when said valve body (21) occupies its closed position after being open so as to stabilize said valve body (21) in said closed position after being open, and
said valve body including means (22) for closing said second passage means (26) when said valve body (21) occupies its open position.

13. Pneumatic screw or nut runner according to claim 12 comprising a housing containing said inlet passage, supply valve and pressure responsive shut-off valve.

14. Pneumatic screw or nut runner according to claim 13, wherein the housing includes annular valve seats (23, 25), and wherein the valve body (21) comprises tube-shaped end portions (22, 24) which are arranged to alternatingly cooperate with the annular valve seats (23, 25) in the housing.

15. Pneumatic screw or nut runner according to claim 13, wherein the housing is provided with a leak passage (30) continuously connecting the opening direction facing area (22) of the valve body (21) to the atmosphere, said leak passage (30) having a cross-section that is considerably less than that of said second passage means (26).

16. Pneumatic screw of nut runner according to claim 12, wherein said closing direction facing area (24) comprises a closing direction facing end of the valve body, and said opening direction facing area (22) comprises an opening direction facing end of the valve body.

* * * * *